(12) United States Patent
Moser

(10) Patent No.: US 6,960,131 B2
(45) Date of Patent: Nov. 1, 2005

(54) GREEN CICER BEAN HARVESTING APPARATUS AND METHOD

(75) Inventor: Thomas Douglas Moser, Genesee, ID (US)

(73) Assignee: TD Moser Farms, L.L.C., Genesee, ID (US)

( * ) Notice: Subject to any disclaimer, the term of this patent is extended or adjusted under 35 U.S.C. 154(b) by 85 days.

(21) Appl. No.: 10/714,409

(22) Filed: Nov. 14, 2003

(65) Prior Publication Data

US 2005/0102991 A1 May 19, 2005

(51) Int. Cl.⁷ .......................... A01D 41/06; A01D 29/00
(52) U.S. Cl. .......................... 460/131; 460/142; 56/14.6
(58) Field of Search .......................... 460/131, 80–89, 460/121, 113, 142, 901; 56/14.6, 126, 128, 328.1, 327.1

(56) References Cited

U.S. PATENT DOCUMENTS

| | | | |
|---|---|---|---|
| 2,934,072 A | 4/1960 | Mather et al. | |
| 3,238,950 A | 3/1966 | Taylor | |
| 3,351,200 A | 11/1967 | Burenga | |
| 3,405,750 A | 10/1968 | Weirauch | |
| 3,709,231 A | 1/1973 | Looker et al. | |
| 3,769,988 A | * 11/1973 | Burenga | 460/142 |
| 3,771,531 A | * 11/1973 | Scribner | 460/23 |
| 3,826,267 A | * 7/1974 | Scribner | 460/142 |
| 3,998,036 A | 12/1976 | Jarrell | |
| 4,087,953 A | 5/1978 | Wilson et al. | |
| 4,229,932 A | 10/1980 | Persoons et al. | |
| 4,951,451 A | 8/1990 | Klinner | |
| 5,005,346 A | 4/1991 | Medernach | |
| 5,036,653 A | 8/1991 | Klinner | |
| 5,052,976 A | 10/1991 | van de Brand | |
| 5,185,991 A | 2/1993 | Klinner | |
| 5,370,579 A | 12/1994 | Brown et al. | |
| 5,372,547 A | 12/1994 | Brown et al. | |
| 5,718,629 A | 2/1998 | Davenport | |
| 5,851,146 A | 12/1998 | Schloesser | |
| 6,315,659 B1 | 11/2001 | Shelbourne | |
| 6,390,915 B2 * | 5/2002 | Brantley et al. | 460/131 |
| 2002/0022505 A1 | 2/2002 | Freeburn | |
| 2002/0148212 A1 | 10/2002 | Schumacher et al. | |

* cited by examiner

Primary Examiner—Robert E. Pezzuto
(74) Attorney, Agent, or Firm—Christensen O'Connor Johnson Kindness PLLC

(57) ABSTRACT

A green cicer bean harvesting method and apparatus. A harvesting combine (100) comprises a threshing apparatus (130) including a rotatable cylindrical drum (132) with an apertured outer wall (134), a main beater (140) and a plurality of satellite beaters (144, 146, 148), and a conveyor system (120, 122, 124) for transporting de-podded beans to a hopper (111), and a pod net conveyor (126) that filters the beans entering the hopper. A return chute (128) returns podded beans from the pod net conveyor to the drum. The apertures in the drum increase in size from smaller apertures at the front of the drum to larger apertures at the rear of the drum. The combine, drum, and beater operating parameters and dimensions are selected to enable effective mechanical harvesting of green cicer beans.

23 Claims, 4 Drawing Sheets

GREEN CICER BEAN HARVESTING APPARATUS AND METHOD

FIELD OF THE INVENTION

The present invention relates to apparatus and method for threshing pulse crops and, in particular, to a harvesting apparatus and method suitable for green cicer bean harvesting.

BACKGROUND OF THE INVENTION

Cicer beans, also known as garbanzo beans, humus bean, chickpea, and other regional monikers, are a high-value crop adapted well for both dry land and irrigated cropping regions. Cicer beans are an annual grain legume or pulse crop that originated in the Fertile Crescent of the Near East. Garbanzos were one of the first legumes cultivated by humans, dating to 7,000–6,000 B.C. Pulse crops, like cicer beans, dry beans, dry peas, faba beans, lentils, and lupin work with rhizobia bacteria to convert nitrogen from the atmosphere into nitrogen nodules on the plant roots. This process increases soil fertility in rotation with other crops such as wheat, barley, and other cereal grains. Cicer beans include two primary classes—the "desi" and the "kabuli" classes or types. Desi plants produce smaller seeds, generally 100 or more seeds per ounce when dried. The seeds have a thick and irregular-shaped seed coat that can range in color when dried from light tan to black. Kabuli types produce larger seeds and have a paper-thin seed coat. Kabuli types produce seeds with colors that range when dried from white to a pale cream colored tan.

World production of the cicer beans is roughly three times that of peas and lentils. Among other pulse crops marketed as human food, world cicer bean consumption is second only to dry beans. Turkey, Australia, Syria, Mexico, Argentina, and Canada are the major cicer bean exporters around the world. Historically, North American cicer bean production was confined to California and the Pacific Northwest. Recently, cicer bean production has expanded into the northern Great Plains regions of Canada and the United States.

Cicer bean plants are erect with primary, secondary, and tertiary branching, resembling a small bush. They flower profusely and have an indeterminate growth habit, continuing to flower and set pods as long as conditions are favorable. Pod set occurs on the primary and secondary branches, and on the main stem. The individual round pods generally contain one seed in kabuli types, and often two seeds in desi types. Cicer bean stems, leaves, and seed pods are covered with small, hair-like glandular structures that secrete malic and oxalate acids, which deter insect pests. Accordingly, insect problems on cicer beans have been minimal and insecticide applications generally have not been necessary.

Mechanically harvested commercial cicer bean production has heretofore been limited to dry beans that are typically harvested at about 13% moisture content or less, and attain a characteristic yellowish cream color. When harvested dry, crop loss can be high as swathing or combining techniques cut the dry cicer bean plant at its stock and threshing mechanisms traditionally used with cereal crops are used to de-pod or thresh the product. Yield losses of up to 33% are not uncommon. Furthermore, the dry cicer bean must undergo extensive rehydration in some instances for canning and transportation to world markets. Garbanzos have a characteristic small, protruding, beak-like structure that is often damaged during dry harvesting through breakage of the brittle bean.

In some areas of the world, cicer beans are harvested by hand when they are green and thereafter de-podded by hand for fresh consumption. The green garbanzo is popular both for its higher nutritional value than that of the traditional dry garbanzo bean and its characteristic sweet taste and medium-bodied texture. Through an increased demand for organic green produce, market demand for the green garbanzo bean has increased dramatically.

There has been no commercially viable way to satisfy the market demand for green cicer beans due primarily to agronomic, harvesting, and processing challenges associated with green cicer beans. From an agronomic perspective, most cicer beans are grown in arid areas or are otherwise subject to high temperatures during ideal harvest time. Green cicer beans are thus highly susceptible to caramelization prior to harvest and processing. Caramelization is the process by which sugars in the green garbanzo are turned into starch. Caramelization of the green garbanzo happens at temperatures of 95° F. or above. Loss of sugars to starch in the green cicer bean completely changes the taste, color, and nutritional value of the product and renders it commercially useless as a green commodity. If the green cicer bean is exposed to caramelization temperatures, it is only marketable as a dried commodity. Accordingly, there exists a need for agronomic methods to avoid the problem of caramelization.

Commercial harvesting of the green cicer bean presents numerous challenges. The green cicer bean pod is tight and leathery, requiring extensive gentle threshing in order to de-pod the product without damaging the bean structure. Harvesting a green cicer bean in prior art harvesters, such as that used for the green pea, results in significant damage to the product and significantly lower yields. Prior art threshing methods fail to open the leathery pod or otherwise remove the pod without damaging the green product. Additionally, due to the unique shape and variation in size of the cicer bean, various threshing challenges are created in order to preserve all features of the shape, including the characteristic small, protruding, beak-like structure of most garbanzo beans. The ideal acreage for growing garbanzo beans is frequently located in areas of the world riddled with topographical challenges, such as slopes as dramatic as 50%, making harvest by prior art harvesters unpracticable. Accordingly, there exists a need for a mechanical harvester that will effectively remove the tough leathery pod of the green cicer bean without damaging the characteristic shape or character of the green product.

Cicer beans have never been commercially produced as a green commodity and thus, several challenges are presented for the commercial exploitation of the cicer bean as a green product. The green garbanzo is maturing in the field daily, and is especially susceptible to change in color, texture and flavor. Food processors and growers face a challenge to produce a marketable product that must be preserved at the peak of quality from the standpoint of color, texture, and flavor. Thus, there exists a need for post-harvest handling and processing methods adapted to preserve the green cicer bean's unique shape, texture, color, and flavor. Furthermore, existing food processing systems must be changed and operated according to methods designed to handle cicer beans that can be harvested and shipped to food processing plants under time-constrained circumstances, where processing of various beans in a number of different standard sizes must be dealt with. For example, desi-type and kabuli-type beans come in different sizes, but will be harvested at the same time—and both need to be handled and processed to preserve color, texture, and flavor. Additionally, there exists a need to ensure a steady supply of top quality green garbanzo produce during harvesting to large food processors, requiring growers to orchestrate timing of plantings such that the green cicer beans will mature and can be harvested in rhythm with processing plant capabilities. For the green cicer bean, especially, quality of the produce demands a minimal amount of stockpiling and a minimal amount of preprocessing storage. Finally, from a processing standpoint, green cicer beans present additional challenges to food processors in never-before-seen leaf and stem trash.

Accordingly, there remains a need for a method and mechanism that address at least some of the problems identified above, whereby green cicer beans may be efficiently and effectively harvested and de-podded without undue damage to the green cicer beans or excessive crop loss.

SUMMARY OF THE INVENTION

It is therefore an object of the present invention to provide a method and apparatus that will permit the effective and productive mechanical harvesting of green cicer beans, such that damage to the green cicer bean crop is within acceptable ranges. In particular, a combine system is disclosed having a rotatable drum for receiving cicer bean plant cuttings, including podded cicer beans, the drum having a peripheral wall with a plurality of apertures. A number of beaters are rotated within the rotating drum, which thresh the cicer bean plant in order to de-pod the cicer beans, which may then fall through the apertures in the drum for conveyance to a hopper.

In an aspect of the invention, the cylindrical drum apertures increase in size from the front of the drum to the rear of the drum, the apertures being between about 0.125 inch and 1.00 inch in diameter.

In one embodiment of the invention, the aperture diameters range from about 0.6 inch at the front of the drum to about 0.75 inch at the rear of the drum, to accommodate kabuli-type cicer beans; and in another embodiment, the aperture diameters range from about 0.35 inch at the front of the drum to about 0.63 inch, to accommodate desi-type cicer beans.

In an embodiment of the invention, the cylindrical drum is rotated at between 10 and 50 rpm and, most preferably, at about 28 rpm.

In an embodiment of the invention, a main beater is rotated at between 50 and 250 rpm and, most preferably, about 125 rpm.

In an embodiment of the invention, a plurality of satellite beaters is rotated in the drum at between 150 and 500 rpm and, most preferably, at about 375 rpm.

In an embodiment of the invention, a conveyor system conveys the de-podded cicer beans to a hopper, and a pod net conveyor returns podded beans to the threshing apparatus.

In an embodiment of the invention, a sample of a green cicer bean from the crop is measured for tenderness, and if the tenderometer measurement is between about 110 and 125, then a threshing combine is maneuvered through the crop to harvest the crop, wherein the combine includes a plurality of beaters and a cylindrical drum having apertures that are between 0.125 and 1.00 inch in diameter, and de-podded beans are conveyed to a pod net conveyor having apertures between 0.125 and 0.88 inch in diameter and disposed over a hopper, and wherein larger beans, such as beans still in the pod, are conveyed back to the drum for further threshing.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

In the past, mechanical harvesting of green cicer beans has not been successfully implemented, because the relatively tough and leathery pod of the green cicer bean was thought not to be amenable to mechanical threshing without causing undue damage to the cicer beans, resulting in significant crop loss. It has been found, however, that by the appropriate selection of certain operating parameters and relatively straightforward modifications to prior art threshing combines, crops of green cicer beans may be mechanically harvested without undue damage to the beans.

Figure 1:
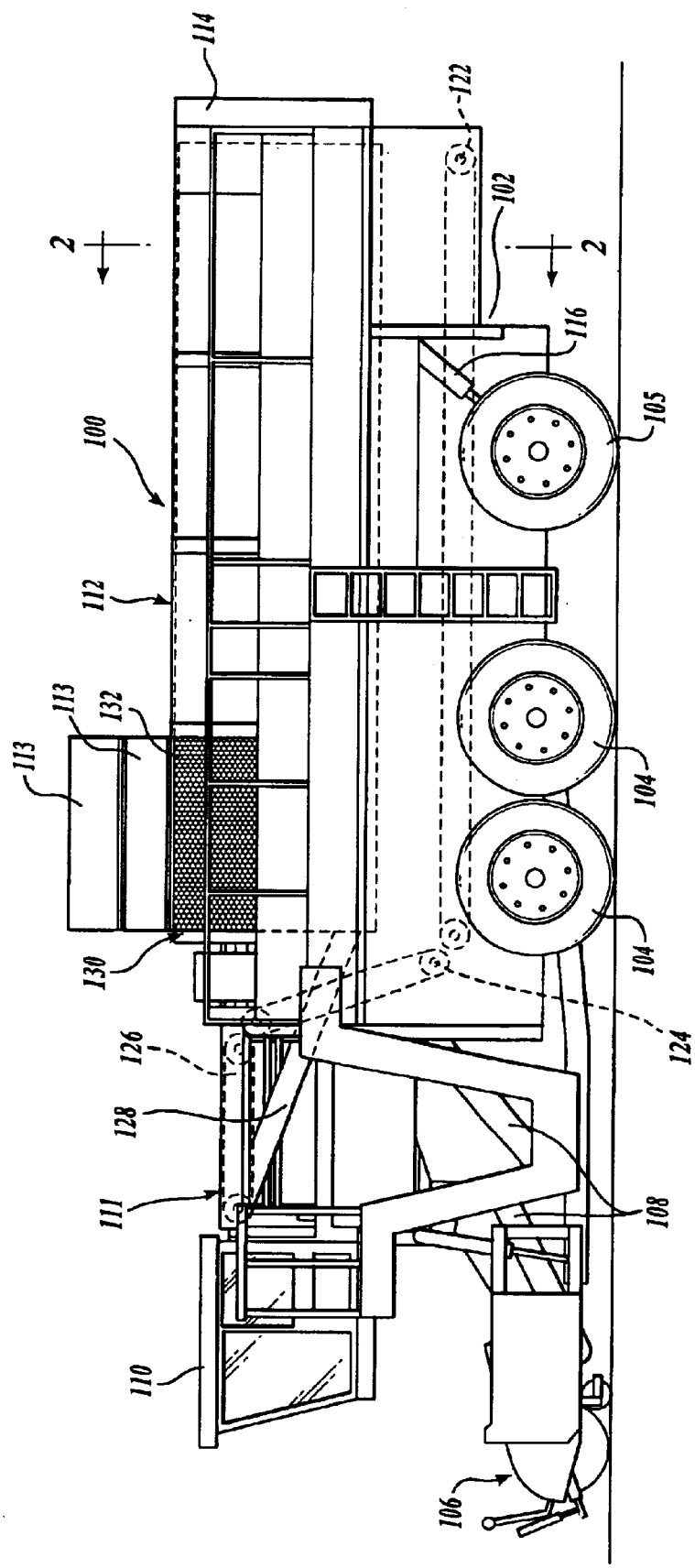
FIG. 1 shows a side view of an embodiment of a green cicer bean harvesting machine according to the present invention.

Referring now to the figures, wherein like numbers indicate like parts, FIG. 1 shows a side view of a green cicer bean harvesting machine or combine 100 according to the present invention. The green cicer bean combine 100 is of the type sometimes referred to as a thresher combine, and includes a chassis frame 102 supporting one or more drive axles 104 that are operatively connected to an engine (not shown) for propelling the combine 100 through a field. At least one rear axle 105, which may or may not be driven and/or steerable, supports the rearward end of the combine 100.

The combine 100 includes a forwardly-disposed crop stripper or header 106 that is adapted to extract a portion of cicer bean plants (not shown) for harvesting, as the combine 100 is maneuvered through a field. A forward elevator conveyor system 108 transports and lifts the extracted portion of the plants rearwardly, depositing the material into a drum 132 of a threshing apparatus 130 (see FIG. 2), as discussed in more detail below. An operator's cabin 110 is disposed near the forward end of the combine 100, preferably positioned to provide the operator with a clear view of the forward end of the header 106. Disposed generally rearward of the cabin 110 is a threshing apparatus 130, at least partially covered by a shroud 112, which may include a number of hinged panels 113, providing access to an interior portion of the combine 100.

A blower or fan 114 is disposed generally at the rearward end of the combine 100, operable to blow air forwardly, through the thresher 130, toward the front of the combine 100. Alternatively, a fan may be disposed near the forward end of the combine 100, to propel air through the drum 132. In a preferred embodiment, a lifter 116, such as a hydraulic piston is disposed generally at the rear axle 105, and is operably connected to a rearward portion of the threshing apparatus 130 and adapted to permit the operator to selectively adjust the angle of the drum 132. For example, the lifter may be adapted to permit drum angles ranging from at least +/−15 degrees. In a most preferred operational mode the drum 132 is maintained at approximately 2 degrees with respect to the horizontal during harvesting of the green cicer beans.

It is desired that the cicer bean plants have a sufficient residency time in the threshing apparatus 130 in order to detach and de-pod the green cicer beans. The time required to de-pod the green cicer bean will depend upon how vigorously the green cicer beans are jostled, squeezed, twisted, and impacted in the threshing apparatus 130. If the threshing apparatus 130 acts too vigorously on the crop, however, the green cicer beans will be damaged, potentially resulting in substantial crop loss.

Figure 2:
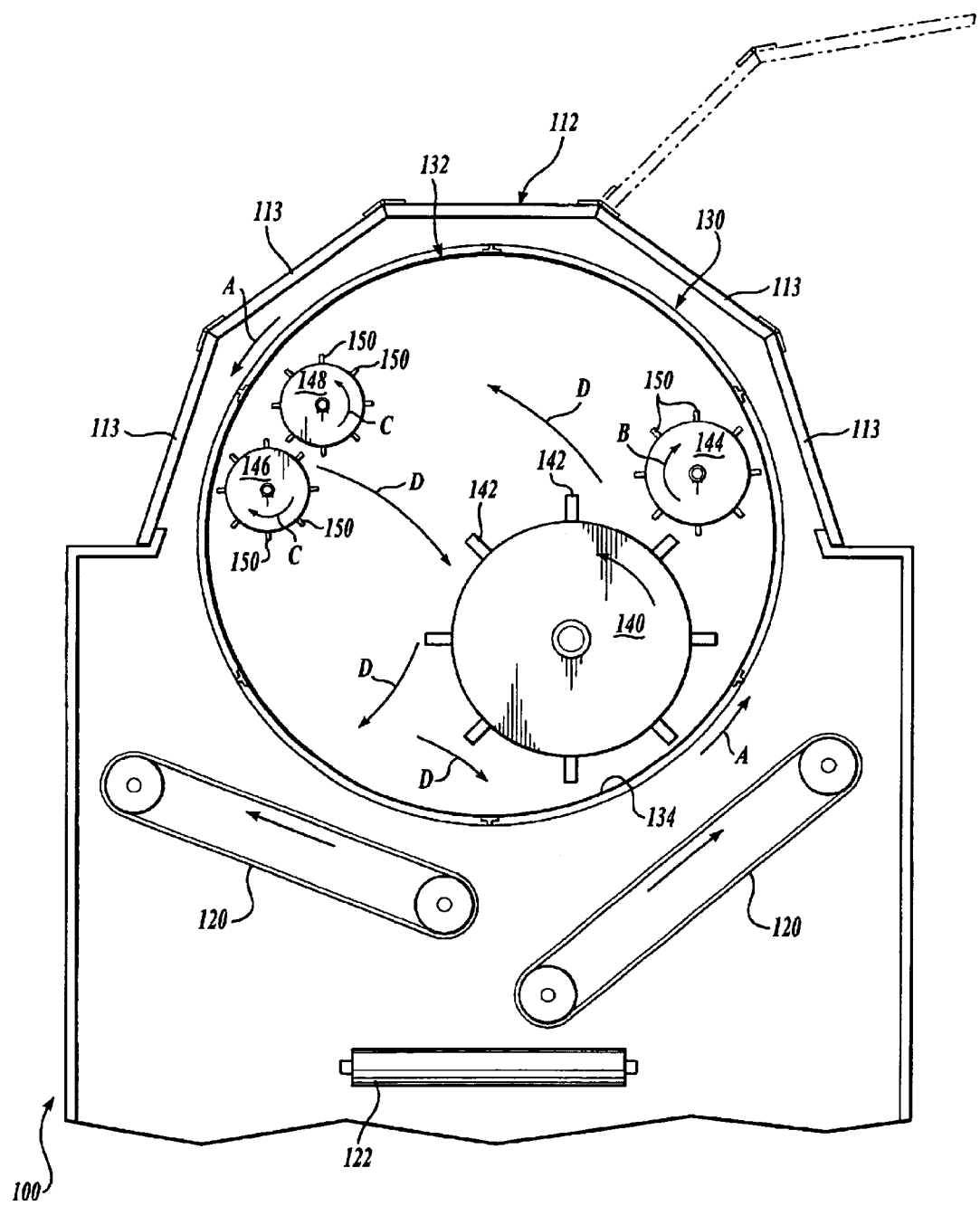
FIG. 2 shows a simplified cross-sectional front view of the threshing component of the cicer bean harvesting machine shown in FIG. 1.

FIG. 2 shows a simplified cross-section of the threshing apparatus 130, generally through section 2—2 in FIG. 1. The threshing apparatus 130 includes a generally cylindrical drum 132, having a sieve-like cylindrical wall 134 that is rotatably supported in the combine 100. The cylindrical outer wall or screen 134 of the drum 132 provides a porous member with apertures sized generally to permit de-podded green cicer beans to exit the drum 132. A pair of oppositely disposed angled conveyors 120 extends at an angle longitudinally under the drum 132 and channel the de-podded green cicer beans to a longitudinal conveyor 122, while conveying unwanted plant material upwardly and away from the longitudinal conveyor 122, where it is typically permitted to fall onto the ground.

Referring again to FIG. 1, the longitudinal conveyor 122 conveys the podded cicer beans forwardly, toward a bulk container or hopper 111 disposed generally between the operator's cabin 110 and the threshing apparatus 130. A substantially upright conveyor, such as a bucket conveyor 124, conveys the beans and other matter from the longitudinal conveyor 122 generally to the top of the hopper 111, where the contents are dumped onto a pod net conveyor 126. The pod net conveyor 126, as is known in the art, is a mesh-like or porous conveyor having a plurality of apertures therethrough. The apertures are preferably sized to allow podded beans to fall into the hopper 111, while conveying larger material, such as unpodded beans, away from the hopper 111. In the preferred embodiment, the pod net conveyor 126 is an endless loop conveyor directed transversely to the longitudinal direction of the combine 100. The larger material that does not fall through the apertures in the pod net conveyor 126 is dumped onto a slide or return chute 128 that directs the material back to the front of the drum 132 for further threshing. It will be appreciated that this permits recovery of the beans that were not de-podded in a first transit through the threshing apparatus 130.

To accommodate the green cicer beans, the pod net conveyor 126 has apertures that are preferably between 0.125 inch and 0.875 inch in diameter and, most preferably, about 0.43 inch in diameter for desi-type cicer beans and about 0.63 inch in diameter for kabuli-type cicer beans. It should be appreciated that throughout this application, the disclosure of preferred diameter dimensions for apertures does not necessarily imply circular apertures, but rather refers to a characteristic width of an aperture, which aperture may be circular, hexagonal, or otherwise compactly shaped.

Referring again to FIG. 2, the drum 132 is rotatably mounted and driven to rotate about its axis, as indicated by the arrows A (counterclockwise in FIG. 2). Drive mechanisms, including hydraulic, mechanical, and electrical, are well known in the art and are not shown in FIG. 2, for clarity. After the cicer bean plants are deposited into the drum 132, they will be jostled somewhat by the gravity and the rotation of the drum 132, facilitating detachment and de-podding of the cicer beans.

A main beater 140 is disposed substantially within the drum 132, rotatable about an axis offset from the drum 132 axis of rotation, and in the same direction as the drum 132 (counterclockwise in FIG. 2). The main beater 140 includes a plurality of outwardly extending fins or paddles 142. The location of the main beater 140 and height of the paddles 142 is selected such that the paddles 142 pass very close to the cylindrical screen wall 134, without contacting the drum 132, such that the cicer beans passing therebetween may be squeezed and/or twisted, helping the de-podding process. Drive mechanisms for driving the main beater are also well known in the art. It will be appreciated by the artisan that although the paddles 142 (and other beater paddles discussed later) are shown diagramatically as substantially rectangular members extending radially, other paddle configurations, as are well known in the art, may alternatively be used, and will provide well-known benefits, such as facilitating moving the cicer bean plant material longitudinally through the drum 132. An example of such paddles is disclosed in U.S. Pat. No. 5,851,146, which is hereby incorporated by reference.

A plurality of satellite beaters 144, 146, 148 (three shown) is rotatably disposed in the drum 132, rotatable about an axis offset from the drum 132 axis of rotation. Each satellite beater 144, 146, 148 includes a plurality (eight shown on each satellite beater) of outwardly extending paddles 150. The first satellite beater 144 is positioned near the main beater 140 and rotates in the opposite direction as the main beater 140, as indicted by the arrow B, such that the main beater 140 and the first satellite beater 144 will cooperatively tend to drive plants passing therebetween generally inwardly. The first satellite beater 144 is also positioned such that the paddles 150 thereon pass near to the screen 134, limiting the amount of plants that can bypass the first satellite beater 144.

The second and third satellite beaters 146, 148 form a pair, that is disposed generally opposite the main beater 140 within the drum 132. The second and third beaters 146, 148 are closely spaced and rotate in opposite directions, as indicated by arrows C, such that plants passing therebetween will be propelled generally inwardly and toward the main beater 140. At least one of the second and third beaters 146, 148 is located such that the paddles 150 thereon pass near to the screen 134.

The operation of the threshing apparatus 130 may now be understood more clearly, with reference to the arrows D, shown in FIG. 2, which arrows indicate schematically a path that at least some of the cicer bean plants will follow. The drum 132 rotates counterclockwise, thereby urging green cicer bean plants that are disposed near the bottom of the drum 132 toward the main beater 140. The paddles 142 on the main beater 140 engage the plants, lifting them towards the first satellite beater 144. The paddles 142, passing near the drum 132, will also tend to squeeze and/or twist any cicer beans disposed therebetween, tending to de-pod the beans. At least some of the plants lifted by the main beater 140 will then be urged between the main beater 140 and the counter-rotating first satellite beater 144, propelling the plants toward the opposite side of the drum 132. Some of the pods passing therebetween will also be squeezed and/or twisted. It will also be appreciated that the counter-rotating first satellite beater 144 will also facilitate driving plants toward and between the main beater 140 and the first satellite beater 144. At least a portion of the plants propelled to the opposite side of the drum 132 will be engaged by the pair of satellite beaters 146, 148. The satellite beaters 146, 148 are also counter-rotating, such that the plants will be urged therebetween and propelled back toward the main beater 140, wherein the plants are propelled downwardly, to repeat the cycle. The jostling, impacts, squeezing, and/or twisting of the green cicer bean plants all contribute to loosening the pods from the vines, and de-podding the beans.

The combine 100 is maneuvered through a cicer bean field to harvest the crop. In conventional dry bean harvesting, the cicer beans are harvested relatively late in their development, typically when the dry cicer beans' moisture content is below about 13%. In green cicer bean harvesting, in contrast, the cicer beans are harvested relatively early in their development. Rather than determining the beans moisture content to determine the best time to harvest, the harvest time for the green cicer beans is determined with reference to the tenderness of the beans, as measured by a tenderometer, which is a standard device well known in the art. In the present invention, the green cicer beans are preferably harvested when they have a tenderometer measurement between about 110 and 125 and, most preferably, about 117.

As noted above, the mechanical harvesting of green cicer beans is problematic due to the physical characteristics of the green cicer bean and, in particular, de-podding the beans from the tough, leathery pod was believed to require processing that would unduly damage the meat of the beans. It has been found possible, however, to operate the threshing apparatus 130 described herein with beater speeds and drum speed such that the green cicer beans are adequately de-podded. The underlying principal is that the cicer plants be threshed relatively gently to limit damage to the green cicer beans, while providing sufficient residency time in the thresher apparatus 130 to effectively de-pod the green cicer beans. In a preferred embodiment, the combine 100 transit speed or ground speed of the combine 100 is between one and five mph and, most preferably, about 2.25 to 3.0 mph; the drum 132 rotates at 10–50 rpm and, most preferably, at about 28 rpm; the main beater 140 rotates at 50–250 rpm and, most preferably, at about 125 rpm; and the satellite beaters 144, 146, 148 rotate at 150–500 rpm and, most preferably, at about 375 rpm.

Figure 3:
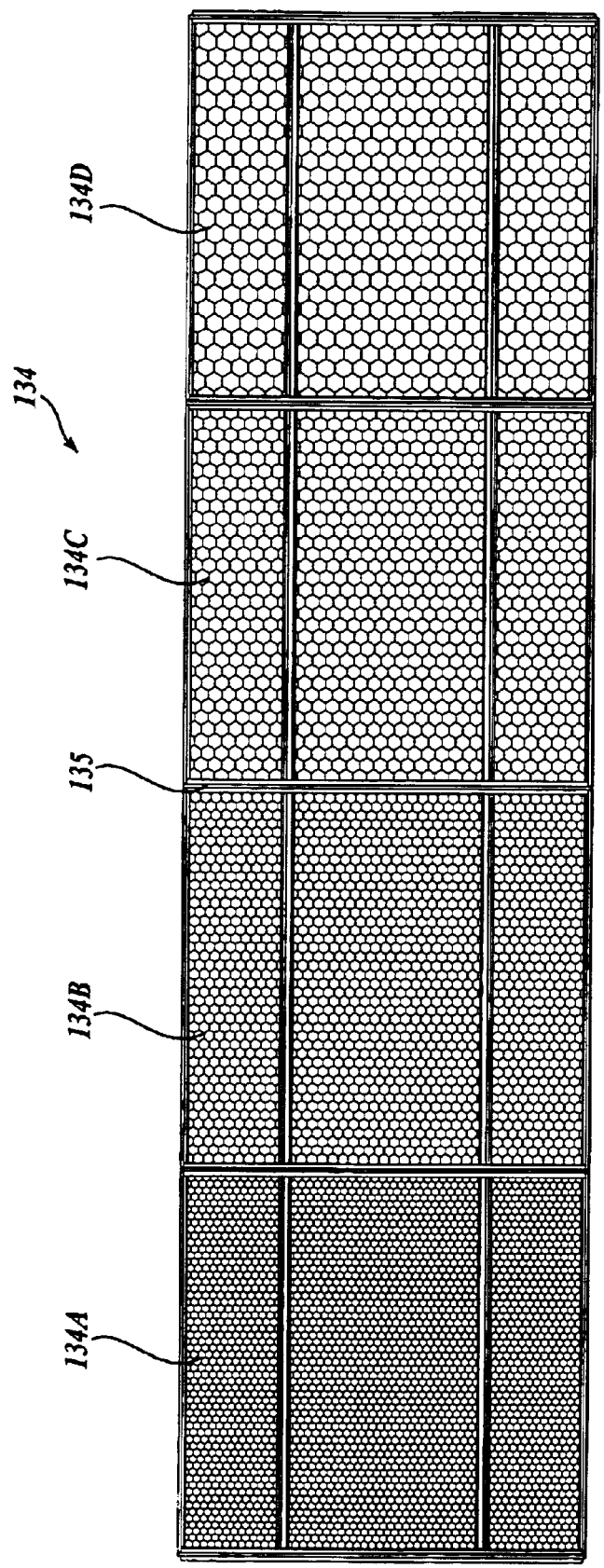
FIG. 3 shows a perspective view of the graduated-aperture sieve barrel for the threshing component shown in FIG. 2.

The drum 132 and, in particular, the screen 134, are sized to permit de-podded beans to pass therethrough, whereby the beans are separated from the other plant material, including podded beans and vines. In another aspect of the preferred embodiment of the present invention, as shown in FIG. 3, the cylindrical screen wall 134 of the drum 132 includes apertures that increase in size from the front of the drum 132 toward the rear. In this embodiment, the drum wall 134 comprises four segments 134A, 134B, 134C and 134D, that are rigidly supported in a cylindrical frame 135. The apertures increase in size, the first segment 134A having the smallest apertures, and the fourth segment 134D having the largest apertures. Currently, it is preferred that all of the apertures are between 0.125 and 1.00 inch in width (or diameter). In the most preferred embodiment: the apertures in the first segment 134A are about 0.60 inch wide for the kabuli-type cicer bean, and about 0.35 inch wide for the desi-type cicer bean; the apertures in the second segment 134B are about 0.69 inch wide for the kabuli-type cicer bean, and about 0.45 inch wide for the desi-type cicer bean; the apertures in the third segment 134C are about 0.75 inch wide for the kabuli-type cicer bean, and about 0.58 inch wide for the desi-type cicer bean; and the apertures in the fourth segment 134D are about 0.75 inch wide for the kabuli-type cicer bean, and about 0.58 inch wide for the desi-type cicer bean.

It will be appreciated that the larger apertures in the distal section of the screen 134D permit podded cicer beans to fall through to the longitudinal conveyor 122 (see FIGS. 1 and 2), where they are conveyed forwardly to the pod net conveyor 126, and are returned to the drum 132 for further threshing, as discussed above. The preferred shape for the apertures is hexagonal, as this best accommodates the shape of the cicer beans.

Figure 4:
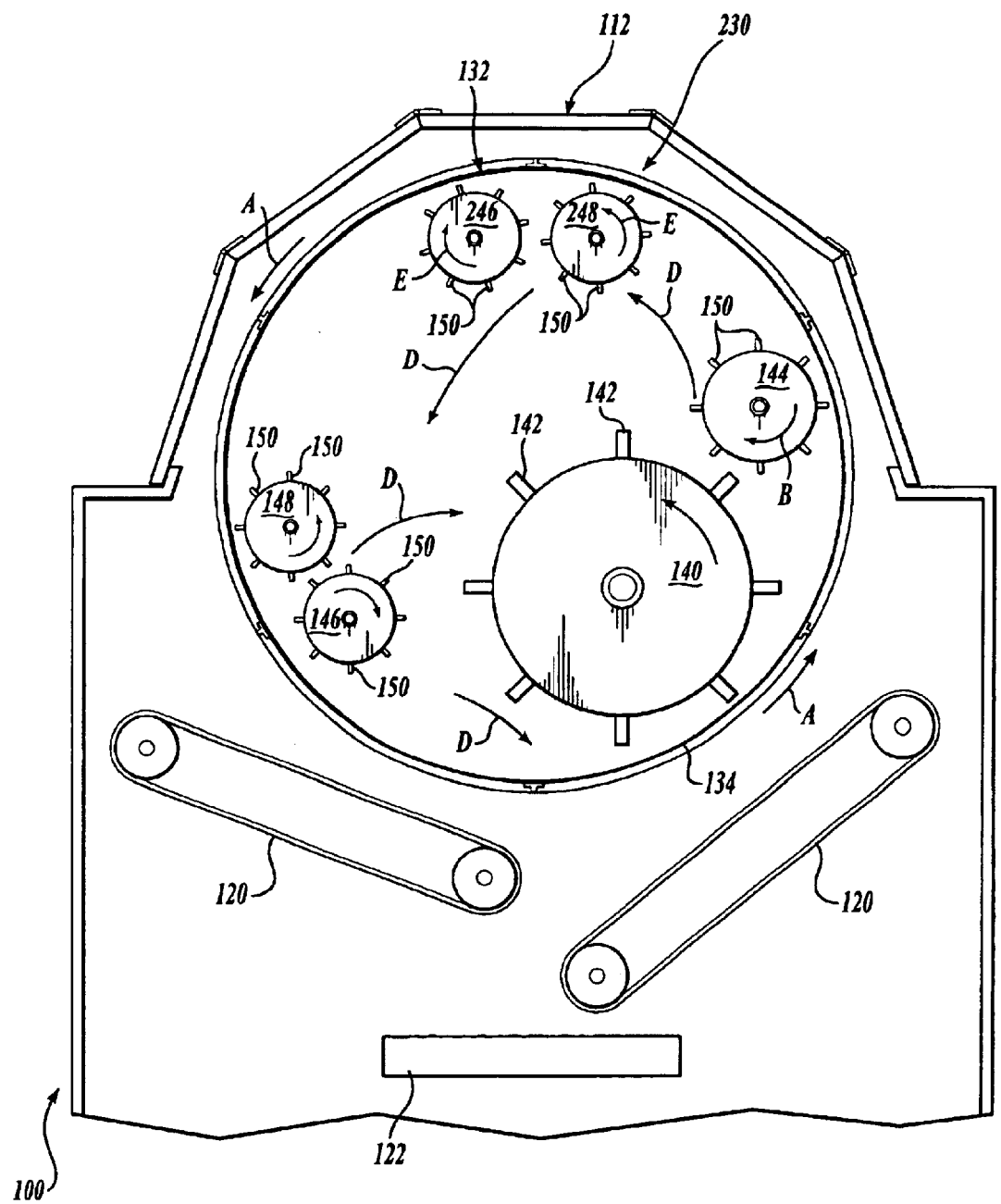
FIG. 4 shows a simplified cross-sectional front view of an alternative embodiment of the threshing component for the cicer bean harvesting machine shown in FIG. 1.

A simplified cross-sectional view of another embodiment of a threshing apparatus 230 is shown in FIG. 4. In this embodiment, the thresher 230 includes a main beater 140 with longitudinal paddles 142, and first, second, and third satellite beaters 144, 146, 148, also with longitudinal paddles 150, all disposed in the rotating drum 132, substantially as described above and shown in FIG. 2. In this embodiment, however, the threshing apparatus includes fourth and fifth satellite beaters 246, 248, similar to and disposed generally parallel to, the second and third satellite beaters 146, 148. The fourth and fifth satellite beaters 246, 248 are disposed near the screen wall 134 of the drum 132, and are counter-rotating as indicated by the arrows E, such that these beaters 246, 248 also tend to urge the cicer plant inwardly. The use of additional beaters 246, 248 permits more frequent threshing of the cicer plants (per drum 132 revolution), which also permits the speed of the beaters to be reduced to achieve effective threshing, thereby making the process more gentle to the cicer beans.

While the preferred embodiment of the invention has been illustrated and described, it will be appreciated that various changes can be made therein without departing from the spirit and scope of the invention.

What is claimed is:

1. A green cicer bean combine comprising:
  a motorized vehicle;
  a cylindrical drum having a forward end and a rearward end, the cylindrical drum being rotatably mounted in the motorized vehicle, wherein the drum has a plurality of apertures therethrough sized to accommodate green cicer beans; and
  a plurality of beaters rotatably mounted in the motorized vehicle and extending longitudinally through the cylindrical drum, each beater rotatable about an axis offset and parallel to a rotational axis of the cylindrical drum;
  wherein the apertures in the drum are between about 0.125 and 1.00 inch in diameter, and further, wherein the apertures increase in diameter from smaller at the forward end to larger at the rearward end.

2. The green cicer bean combine of claim 1, wherein the smaller apertures are about 0.6 inch in diameter and the larger apertures are about 0.75 inch in diameter.

3. The green cicer bean combine of claim 1, wherein the smaller apertures are about 0.35 inch in diameter and the larger apertures are about 0.63 inch in diameter.

4. The green cicer bean combine of claim 1, wherein the cylindrical drum is driven to rotate at about 10 to 50 rpm.

5. The green cicer bean combine of claim 4, wherein the cylindrical drum is driven to rotate at about 28 rpm.

6. The green cicer bean combine of claim 1, further comprising a hopper for receiving de-podded cicer beans, and a conveyor system adapted to convey the cicer beans from the drum to the hopper.

7. The green cicer bean combine of claim 6, wherein the conveyor system includes a longitudinal conveyor disposed directly below the cylindrical drum, a bucket conveyor extending from the longitudinal conveyor to the hopper, and a pod net conveyor disposed generally over the hopper, the pod net conveyor having a plurality of apertures therethrough.

8. The green cicer bean combine of claim 7, wherein the apertures in the pod net conveyor are between about 0.125 and 0.88 inch in diameter.

9. The green cicer bean combine of claim 7, further comprising a return mechanism positioned to receive cicer beans from the pod net conveyor that are larger than the pod net conveyor apertures and return the received cicer beans into the cylindrical drum.

10. The green cicer bean combine of claim 4, wherein the plurality of beaters comprises a relatively large main beater and at least three relatively small satellite beaters.

11. The green cicer bean combine of claim 9, wherein the main beater is driven to rotate at between 50 and 250 rpm.

12. The green cicer bean combine of claim 9, wherein the main beater is driven to rotate at about 125 rpm.

13. The green cicer bean combine of claim 11, wherein the satellite beaters are driven to rotate at between 150 and 500 rpm.

14. The green cicer bean combine of claim 12, wherein the satellite beaters are driven to rotate at about 375 rpm.

15. A method of harvesting green cicer beans comprising the steps of:

measuring the tenderness of a sample cicer bean from a crop of cicer beans with a tenderometer to determine a tenderometer reading;

maneuvering a threshing combine through a field of cicer beans if the tenderometer reading is between about 110 and 125, wherein the threshing combine includes a head, a cylindrical drum, a main beater and a plurality of satellite beaters, wherein the cylindrical drum includes an outer wall having a plurality of apertures that is sized between 0.125 inch and 1.00 inch in diameter, such that de-podded cicer beans can exit the cylindrical drum through the apertures;

conveying the cicer beans to a pod net conveyor disposed over a hopper, wherein the pod net conveyor includes a plurality of apertures having a diameter between 0.125 inch and 0.88 inch, such that cicer beans smaller than the apertures will fall into the hopper; and conveying cicer beans larger than the apertures on the pod net conveyor back to the cylindrical drum for further threshing.

16. The method of claim 15, wherein the threshing combine is maneuvered through the field if the tenderometer reading is about 117.

17. The method of claim 15, further comprising rotating the cylindrical drum at between 10 and 50 rpm.

18. The method of claim 17, wherein the cylindrical drum is rotated at about 28 rpm.

19. The method of claim 17, further comprising rotating the main beater at between 50 and 250 rpm, and rotating the satellite beaters at between 150 and 500 rpm.

20. The method of claim 15, wherein the cylindrical drum comprises at least a forward section having smaller apertures and a rearward section having larger apertures, and wherein the smaller apertures are about 0.6 inch in diameter and the larger apertures are about 0.75 inch in diameter, to accommodate the kabuli-type cicer bean.

21. The method of claim 15, wherein the cylindrical drum comprises at least a forward section having smaller apertures and a rearward section having larger apertures, and wherein the smaller apertures are about 0.35 inch in diameter and the larger apertures are about 0.63 inch in diameter, to accommodate the desi-type cicer bean.

22. The method of claim 20, wherein the combine is maneuvered at about 2.5 mph.

23. The method of claim 16, wherein the plurality of satellite beaters comprises at least five satellite beaters, and wherein the satellite beaters rotate at between 150 and 500 rpm.

\* \* \* \* \*